US011397549B1

(12) United States Patent
Tamarez Gomez et al.

(10) Patent No.: US 11,397,549 B1
(45) Date of Patent: Jul. 26, 2022

(54) IMAGE MAGNIFICATION ADJUSTMENT USING CUSTOMER IMAGES DURING MIXED PAGE JOB

(71) Applicant: Xerox Corporation, Norwalk, CT (US)

(72) Inventors: Frank B. Tamarez Gomez, Webster, NY (US); Christopher Douglas Atwood, Rochester, NY (US); Jacob R. McCarthy, Williamson, NY (US); Joseph Fredrick Casey, Webster, NY (US); Joseph M. Ferrara, Jr., Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/209,366

(22) Filed: Mar. 23, 2021

(51) Int. Cl.
*G06F 11/00* (2006.01)
*G06F 3/12* (2006.01)
*G06T 7/00* (2017.01)

(52) U.S. Cl.
CPC ............ *G06F 3/121* (2013.01); *G06F 3/1208* (2013.01); *G06F 3/1252* (2013.01); *G06F 3/1254* (2013.01); *G06F 3/1257* (2013.01); *G06F 3/1273* (2013.01); *G06T 7/0004* (2013.01); *G06T 2207/10008* (2013.01); *G06T 2207/30144* (2013.01)

(58) Field of Classification Search
CPC .... G06F 3/1252; G06F 3/1257; G06F 3/1273; G06F 11/00; G06T 2207/30144; H04N 1/00031; H04N 1/00005; H04N 1/00684
USPC ........ 358/1.2, 1.5, 1.9, 3.21, 3.26, 1.18, 540
See application file for complete search history.

(56) References Cited

U.S. PATENT DOCUMENTS

| 6,373,042 | B1 | 4/2002 | Kretschmann | |
|---|---|---|---|---|
| 7,519,222 | B2 | 4/2009 | Kisiley | |
| 7,773,774 | B2 | 8/2010 | Rasmussen | |
| 8,520,266 | B2 | 8/2013 | Elliot | |
| 8,553,280 | B2 | 10/2013 | Hoover | |
| 2005/0007440 | A1* | 1/2005 | Nishikawa | H04N 1/047 347/132 |
| 2011/0102817 | A1* | 5/2011 | Hoover | H04N 1/506 358/1.9 |
| 2011/0109918 | A1 | 5/2011 | Conlon | |

OTHER PUBLICATIONS

U.S. Appl. No. 16/988,183, filed Aug. 7, 2020, Taylor.

* cited by examiner

*Primary Examiner* — Jamares Q Washington
(74) *Attorney, Agent, or Firm* — Fay Sharpe LLP

(57) ABSTRACT

An image processing system and method provide for receiving a current print job comprising a set of digital page images to be printed on print media sheets, identifying, for each page image, a set of input parameters, the set of input parameters including one or more of a print media sheet weight, a print media sheet size, a print media sheet thickness, a print media sheet porosity, a print media sheet coating, a print media sheet color, and an area coverage. The method further includes generating an adjustment for each page image, based on the set of input parameters and based on stored magnification errors generated for prior printed pages of print jobs, the adjustment being predicted to reduce at least one magnification error when the page image of the current print job is rendered on print media to form a printed image.

20 Claims, 11 Drawing Sheets

| date | paper name | basis weight (g/500 sheets) | coating type | width (in.) | length (in.) | area coverage (%) | landscape/ portrait | print speed (sheets/min) | dryer temp. (°C) |
|---|---|---|---|---|---|---|---|---|---|
| 1/20/2021 | XY reg. | 20 | 0 | 8.5 | 11 | 20 | P | 200 | 110 |
| 1/20/2021 | XY reg. | 20 | 0 | 8.5 | 11 | 50 | P | 120 | 110 |
| 1/23/2021 | XY reg. | 20 | 0 | 8.5 | 11 | 70 | L | 100 | 120 |
| 1/24/2021 | XY Bond | 40 | 1 | 8.5 | 11 | 50 | P | 100 | 120 |
| 1/25/2021 | XY Bond | 40 | 1 | 8.5 | 11 | 70 | P | 80 | 110 |
| 1/27/2021 | XY heavy | 60 | 1 | 8.5 | 11 | 80 | L | 100 | 140 |
| 1/27/2021 | XY Large | 20 | 0 | 8.75 | 16.5 | 30 | L | 100 | 120 |
| 1/28/2021 | XY reg. | 20 | 0 | 8.5 | 11 | 40 | P | 200 | 110 |

| Mag. Error length (mm) side 1 | Mag. Error width (mm) side 1 | Adjustment to image length (mm) side 1 | Adjustment to image width (mm) side 1 |
|---|---|---|---|
| -0.12 | -0.1 | +0.12 | +0.1 |
| -0.15 | -0.13 | +0.15 | +0.13 |
| -0.05 | -0.04 | +0.05 | +0.04 |
| -0.09 | -0.7 | +0.09 | +0.7 |
| -0.21 | -0.18 | +0.21 | +0.18 |
| -0.24 | -0.21 | +0.24 | +0.21 |
| -0.32 | -0.18 | +0.32 | +0.18 |

FROM FIG. 3A

FIG. 3B

IMAGE MAGNIFICATION ADJUSTMENT USING CUSTOMER IMAGES DURING MIXED PAGE JOB

BACKGROUND

The exemplary embodiment relates to image registration and finds particular application in a system and method for improved registration between a source image and a printed image when print media changes.

When printing a digital source image (such as a scanned image) on paper, registration errors can occur, resulting in geometric differences between the printed (target) image and the source image as well as poor alignment between a printed target image on a front side of a sheet and a printed target image on a reverse side of the sheet. Image on paper (IOP) registration and front to back image alignment has often been solved by printing and measuring specifically designed test patterns during diagnostic or setup routines, where the distance between edges of the paper and specific marks are measured, either manually or automatically. The printing device is then calibrated to reduce or eliminate the errors.

One problem with this approach is that it is time consuming and thus often impractical to perform for every image. Additionally, over time, the printing device may suffer drift, for a variety of reasons, and recalibration is needed to bring the device back into compliance.

Methods are being developed to perform registration on customer images, which avoids the need to print specifically designed test patterns. This relies on the printer performing in the same manner for a sequence of pages, so that registration corrections learned for one printed page are applicable to the next. However, this is not always the case when different stocks are used. For example, paper shrinkage, the amount of ink used, paper grain direction, dryer power and paper weight may all affect IOP registration. As a result, IOP registration adjustments may be needed each time the paper is changed.

There remains a need for a system and method for determining registration errors between a source image and a printed image in real-time.

INCORPORATION BY REFERENCE

The following references, the disclosures of which are incorporated herein in their entireties by reference, are mentioned.

U.S. application Ser. No. 16/988,183, Filed Aug. 7, 2020, entitled SYSTEM AND METHOD FOR MEASURING IMAGE ON PAPER REGISTRATION USING CUSTOMER SOURCE IMAGES, by Taylor, et al., describes a system and method for registering a source image with a target image in a scanned image that is generated by printing the source image and scanning the printed source image. The source and target images are registered, first by aligning the corners of the source image and target image and then through a transform based on detected local features.

U.S. Pat. No. 8,520,266, issued Aug. 27, 2013, entitled METHOD AND APPARATUS FOR MEASURING IMAGE ON PAPER REGISTRATION, by Elliot, et al., describes a method and apparatus for measuring image on paper registration. The method includes placing a test sheet of media including a plurality of test pattern marks on a platen of an image sensing device. The platen defines a scan area over which the image sensing device is capable of scanning an image. The image sensing device includes a plurality of calibration marks falling within the scan area. The method further includes operating the scanner to scan the test sheet, determining a scanned position of the calibration marks and a scanned position of the test marks resulting from the scan, comparing the scanned position of the calibration marks with reference position of the calibration marks to determine scanning error, determining an adjusted position of the test marks responsive to the scanning error, and comparing the adjusted test mark positions with predetermined reference positions to measure registration accuracy. An edge guide disposed on the platen assists in aligning the test sheet for scanning.

U.S. Pat. No. 6,373,042, issued Apr. 16, 2002, entitled REGISTRATION SYSTEM FOR A DIGITAL PRINTER WHICH PRINTS MULTIPLE IMAGES ON A SHEET, by Kretschmann, et al., describes a printing apparatus which forms multiple images on a sheet in separate operations. An edge position detector upstream of each marking device determines the location of the sheet so that an image may be precisely placed on the sheet. The system is said to ensure that images on both sides of a sheet are in registration with each other.

U.S. Pat. No. 8,553,280, issued Oct. 8, 2013, entitled IMAGE ON PAPER REGISTRATION USING IMAGE MARKS, by Hoover, et al., describes a method for adjusting the registration of images printed on paper. A first image location is determined on one sheet by measuring distances from two adjoining edges of the respective corners to a fiducial mark. The location measurements are used to adjust a second image to be transferred to another sheet.

U.S. Pub. No. 20110109918, published May 12, 2011, entitled CONTROLLING PLACEMENT AND MINIMIZING DISTORTION OF IMAGES IN AN IMAGING DEVICE, by Conlon, et al., describes a method to control an imaging device. Collections of two-dimensional image points in respective vector spaces are received for source and target images. The two collections of two-dimensional image points are converted into a homogenous form to apply affine matrix transformations. A matrix transformation is solved to map the first collection to the second collection. The matrix transformation is used to adjust distortion of the target image in an imaging device.

U.S. Pat. No. 7,519,222, issued Apr. 14, 2009, entitled PRINT DEFECT DETECTION, by Kisilev, et al., describes automatic detection of print defects in printed matter. Detail maps of a reference image and a corresponding scanned image are generated by identifying differences between pixels in each of one or more directions. Blocks of the reference image detail map and the respective blocks of the scanned image detail maps are compared.

U.S. Pat. No. 7,773,774, issued Aug. 10, 2010, entitled DYNAMIC TEST PATTERN COMPOSITION FOR IMAGE-ANALYSIS BASED AUTOMATIC MACHINE DIAGNOSTICS, by Rasmussen, et al., describes a system and method for test target selection in conjunction with dynamic test pattern generation. A test pattern page is composed using an optimal set of test targets, which can be accommodated or adjusted to fit within size constraints of the test pattern, based on layout optimization to ensure that related and optimized test targets are accommodated on a single test pattern.

BRIEF DESCRIPTION

In accordance with one aspect of the exemplary embodiment, an image processing system includes a reception component which receives a current print job comprising a set of digital page images to be printed on print media sheets. A print job processing component identifies, for each page image, a set of input parameters. The set of input parameters includes at least one of a print media sheet weight, print media sheet size, print media sheet thickness, print media sheet porosity, print media sheet coating, print media sheet color, and an area coverage. At least one prediction component is provided for generating an adjustment for each page image, based on the set of input parameters and based on stored magnification errors generated for previously printed digital page images, the adjustment being predicted to reduce at least one magnification error when the page image of the current print job is rendered on print media to form a printed image. An adjustment component implements the adjustments.

The components of the system may be implemented by a processor.

In accordance with another aspect of the exemplary embodiment, a method includes receiving a current print job comprising a set of digital page images to be printed on print media, identifying, for each page image, a set of input parameters. The set of input parameters include at least one of a print media sheet weight, print media sheet size, print media sheet thickness, print media sheet porosity, print media sheet coating, print media sheet color, and an area coverage. The method further includes generating an adjustment for each page image, based on the set of input parameters and based on magnification errors generated for prior print jobs, the adjustment being predicted to reduce at least one magnification error when the page image is rendered on print media by an associated printing device, and implementing the adjustments.

In accordance with another aspect of the exemplary embodiment, an image processing system includes a printing device which renders digital page images of a print job on print media sheets to form printed images. A sensor system captures scanned images of the printed images. A magnification adjustment component adjusts the printing of the digital page images to reduce predicted magnification errors in the printed images, based on: an area coverage and a print media sheet weight for printing each of the digital page image, and magnification errors and respective area coverage and print media sheet weight for previously printed images.

BRIEF DESCRIPTION OF THE DRAWINGS

FIG. 3, which is split into FIGS. 3A and 3B for ease of illustration, illustrates part of an exemplary database in the adjustment component of FIG. 1;

DETAILED DESCRIPTION

Aspects of the exemplary embodiment relate to a system and method for automatic adjustment of image magnification to account for differences in sheet shrinkage (and/or sheet stretching) of print media during printing which can lead to variations in magnification of printed images. The system generates image on paper data, such as magnification information, for different types of print media under different printing conditions and uses the information to provide adjustments for images to be printed to reduce magnification errors on the resulting printed sheets. The magnification information may be generated by comparing captured images of printed sheets with digital source images from which the printed sheets are generated. In particular, the dimensions of a target image (corresponding to the printed image) identified within the captured image are compared to those of the source digital source image to determine differences corresponding to magnification errors. In one embodiment, a database stores the magnification information and/or adjustments based thereon for a set of one or more input parameters, such as print media parameters (e.g., sheet dimensions, sheet weight (e.g., basis weight), orientation of print media, print media sheet thickness, print media sheet porosity, print media sheet coating, print media sheet color and/or other print media parameters which affect shrinkage/stretching, which are both generally referred to as magnification) and a set of one or more printing parameters (e.g., expected area coverage of marking material on the printed sheet, printer speed, dryer temperature (or dryer power), and/or other printing parameters which influence shrinkage/stretching). In one embodiment, the input parameters include at least one of the print media sheet weight and the expected area coverage. The database may be used to generate magnification adjustments for each sheet of a current print job. The database may be updated based on magnification information generated for the printed sheets of the print job to improve future predictions.

In one embodiment, a model may be learned which takes the print media parameters and printing parameters selected for an input source image or set of source images of a print job and predicts magnification adjustments for each of the source images such that when printed, the image registration (side to side and/or sheet to sheet) is optimized.

Advantages of the system and method may include improvements in registration between images printed on first and second sides of a sheet and/or improvements in sheet to sheet registration when different types of print media are used in a print job. This can result in eliminating or reducing the need for running separate diagnostic routines, reducing waste (paper and ink used during setup routines, as well as defective pages due to poor registration) and increased productivity.

Figure 1A:
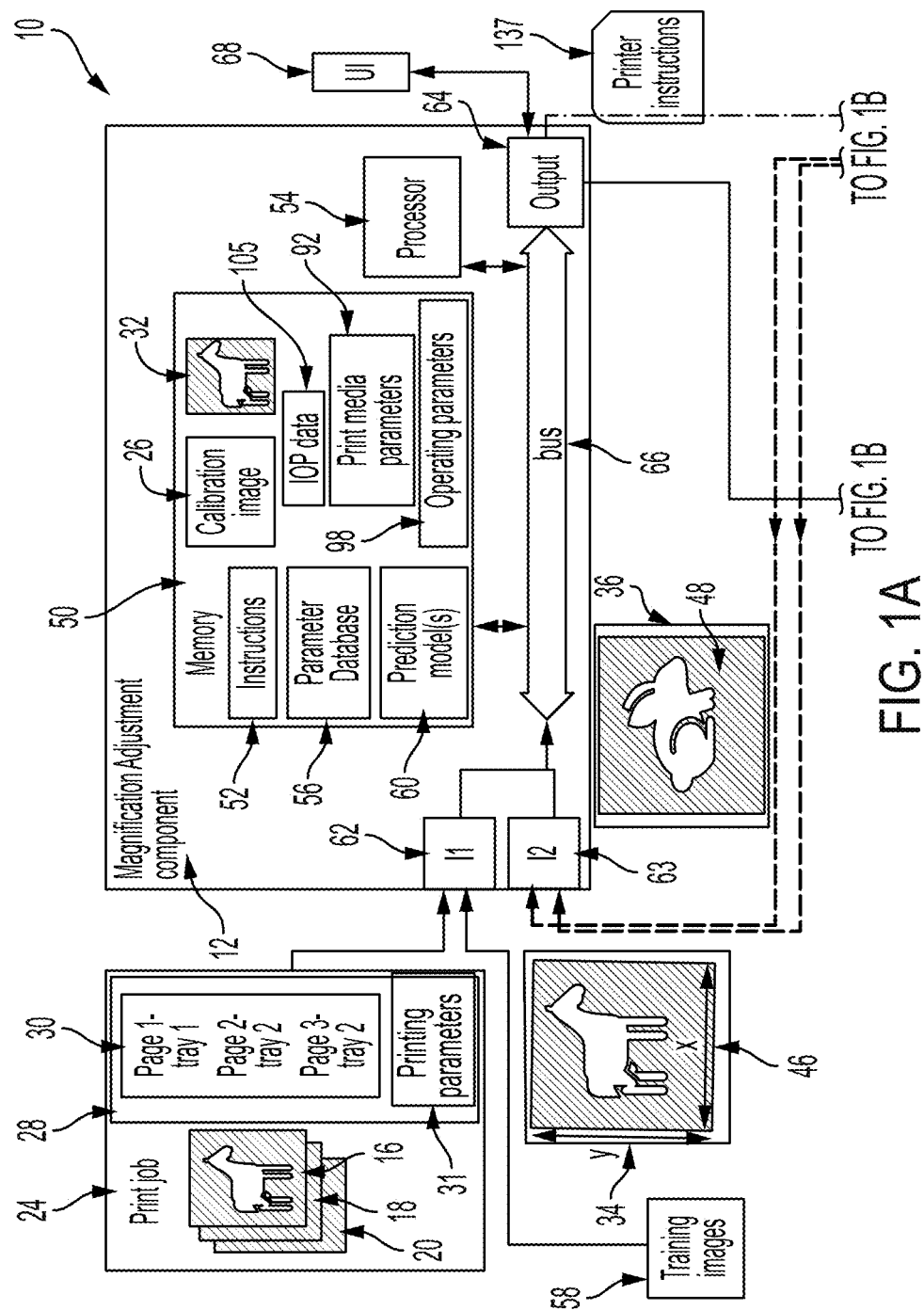
FIG. 1, which is split into FIGS. 1A and 1B for ease of illustration, is a functional block diagram of an image processing system including a magnification adjustment component, in accordance with one aspect of the exemplary embodiment.
Figure 1B:
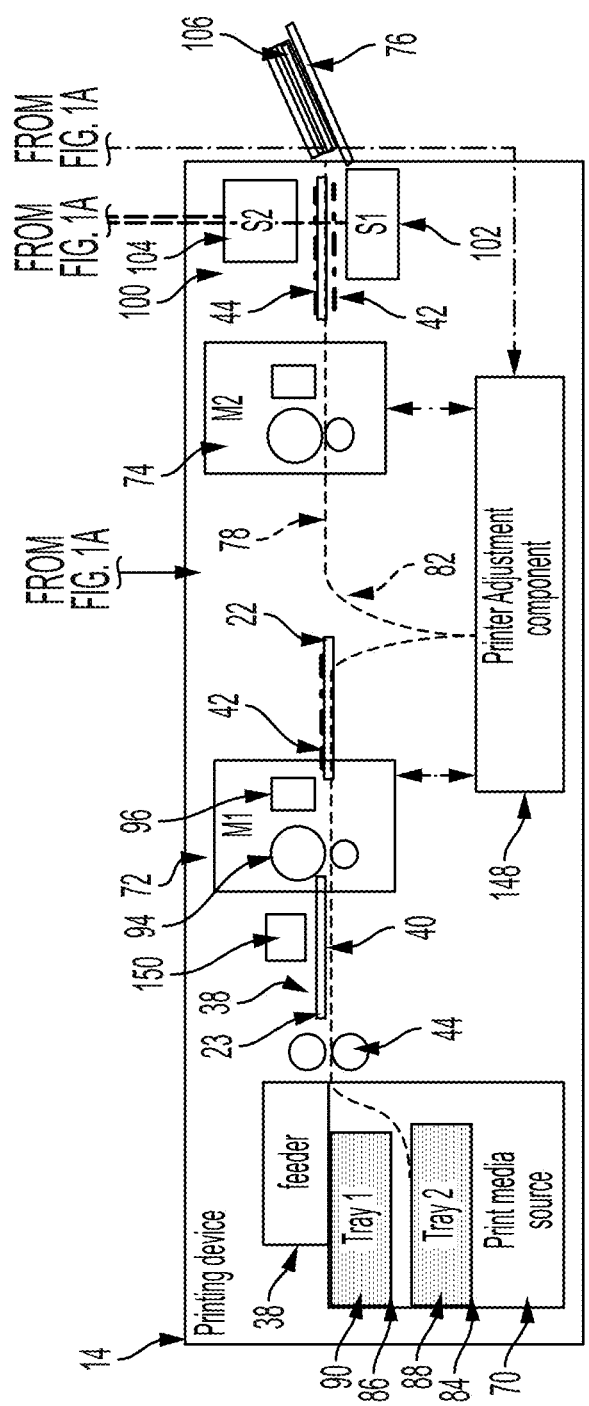

With reference to FIG. 1, which is split into FIGS. 1A and 1B, an image processing system 10 includes a computer-implemented magnification adjustment component 12 and a printing device 14.

A "page image" or "source image" 16, 18, 20 may generally include information in electronic form which is to be rendered on sheets 22, 23, etc. of print media by the printing device 14 and may include text, graphics, pictures, and the like. The content of the source image may be defined by an array of pixels of different colors (or monochrome shades of grey). For convenience, the term "source image"

is also used to refer to images that have undergone some preprocessing in order to render them suitable for printing.

"Print media" can be a usually flimsy physical sheet of paper, plastic, or other suitable physical print media substrate for images. Print media sheets 22, 23 may be of different stocks, e.g., differ in size, thickness, coating, or the like.

A "print job" 24 may include one, two, or more of such source images 16, 18, 20 to be rendered on one or more sheets 22, each of the source images generally comprising different image content. The exemplary source images 16, 18, 20 used herein are generally customer source images, i.e., they are not calibration images. Calibration images are specifically predesigned with fiducial marks for conventional image on paper registration. The locations of the fiducial marks, e.g., crosses, bullseyes, or the like, relative to the corners of the page, are known, prior to printing. In contrast, a source image lacks such fiducial marks. However, in some embodiments, calibration images 26 may be used in training of the adjustment component 12. The print job 24 may be received from a customer device (not shown), such as a computer, memory storage device, or the like.

In addition to the digital page image(s) 16, 18, 20, the print job 24 may include printing instructions 28, such as print media parameters 30 and printing parameters 31. The print media parameters 30 may include, for each sheet to be printed, a stock to be used for each page, which may be identified according to one of a set of print media trays. The printing parameters 31 may include parameters such as duplex or simplex printing, portrait or landscape printing, image quality (e.g., as dots per inch (dpi)), printer speed, dryer temperature, or combinations thereof. Some of the parameters 30, 31 may be specified by default.

A "transformed source image" 32 is a digital image generated from the source image 16, 18, 20 (or instructions for generating a transformed image), which is predicted to reduce magnification errors in the print job 24, when it is printed.

A "scanned image" 34, 36 is a digital image of a respective side 38, 40 of a printed sheet 22 which has been generated by printing one or more of the source images 16, 18, 20 on the sheet 22, in the form of a printed image 42, 44. Each scanned image 34, 36 includes a target image 46, 48, respectively, corresponding to a respective one of the source images. The scanned image may be captured as an array of pixels in monochrome or full color.

The adjustment component 12 includes memory 50, which stores software instructions 52 for performing the exemplary method, and a processor 54, in communication with the memory, for executing the instructions. Memory 50 may also store an input print job 24 during processing, one or more calibration images 26, and one or more transformed images 32. Scanned images 34, 36 may also be stored in memory 50, during the exemplary method. A parameter database 56 is also stored in memory 50 or in memory accessible to the adjustment component 12. Training images 58, used for initially generating the parameter database 56, may also be stored in memory 50 of the adjustment component 12 (or in a separate computing device used for initial generation of the parameter database 56). A set 60 of one or more prediction models, which may have been generated from the database 56, may also be stored in memory 50.

A first input device (I1) 62 receives a print job 24 including one or more digital page images (source images) 16, 18, 20, at least some of which including content to be rendered (i.e., the source image is not entirely blank). A second input device (I2) 63 (or the same input device) receives a full-width scanned image 34 of the first side 38 of each sheet and, when duplex printing is used, a full-width scanned image 38 of the second side 48 of each printed sheet. An output device 64 outputs the page images 16, 18, 20 of the print job 24 to the printing device 14 in a format suitable for printing, e.g., after processing each page image of the print job to correct for predicted magnification errors. Hardware components 50, 54, 62, 63, 64 of the adjustment component 12 are communicatively connected by a data/control bus 66. A user interface (UI) 68, connected directly or indirectly with the adjustment component 12, allows for the user to interact with the adjustment component 12 and receive human understandable communications therefrom, e.g., in the form of text, graphics, sounds, haptic signals, combinations thereof, or the like. The user interface 68 may include a display device, such as a screen, and one or more user input devices, such as a keyboard, keypad, cursor control device, touchscreen, or combination thereof.

The printing device 14 can include any device for rendering an image on print media, such as a copier, laser printer, bookmaking machine, facsimile machine, or a multifunction machine (which includes one or more functions such as scanning, printing, archiving, emailing, and faxing). The operation of applying images to print media, is generally referred to herein as printing or rendering.

The exemplary printing device 14 includes a print media source 70, one or more marking devices 72, 74, and an output device 76, which are connected by a sheet transport path 78. Sheets are conveyed from the print media source 70 in a downstream direction along the transport path 78 to the one or more marking devices 72, 74, and ultimately to the output device 76, by a sheet conveyor system 80, composed of rollers, conveyor belts, airjets, combinations thereof, or the like. An inverter 82 may be positioned in the paper sheets for inverting the sheets prior to printing the second side.

The print media source 70 may include a set of trays 84, 86, etc. which each hold a stack 88, 90 of sheets. In a mixed media print job, for example, sheet 22 may be drawn from tray 88, containing sheets of a first stock, while another sheet 23 of the print job may be drawn from tray 90, containing sheets of a second stock. Each tray 84, 86 may be associated, in memory 50, with a set of print media parameters 92 for the sheets currently stocked in the tray. The parameters 92 may include some or all of sheet weight, sheet length, sheet width, sheet thickness, coating, and the like.

The marking device(s) 72, 74 can include any device for applying images 42, 44 to sheets 22, 23 of print media, using a marking material, such as inks or toners, to form at least one side of the printed page. In the illustrated embodiment, a first marking device 72 applies images 42 to side 1 38 and a second marking device 74 applies images 44 to side 2 40 (in the case of duplex printing). However, it is also contemplated that a single marking device may be configured for printing both sides 38, 40 of the sheet. In this case, a return loop (duplex path), which includes the inverter 82, returns sheets to the marking engine for printing side 2.

The marking devices 72, 74 may each include a marking component 94, such as a laser (xerographic) or inkjet marking component, which applies an image to the sheet using a marking material, such as inks or tone particles, and a dryer or other fixing component 96, which affixes the image more permanently to the sheet, e.g., using one or more of heat, pressure or radiation, e.g., UV radiation.

In one embodiment, each marking device 72, 74 is an inkjet marking device, which applies one or more liquid inks to the sheets 22, 23 using a set of inkjet heads. The liquid inks may be water-based inks, which are dried (fixed) to the sheet with heat by a dryer 96, downstream of the inkjet heads. Alternatively, or additionally, the inks may include a radiation curable material, which is cured (fixed) with radiation, such as UV, by a UV curing station 96, downstream of the inkjet heads.

In another embodiment, each marking device 72, 74 is an electrophotographic (laser) marking device, which applies one or more colored toners to the sheets 22, 23 using a photoreceptor in the form of a belt or drum. The toners may be in the form of particles, which are fixed to the sheet with heat and/or pressure, e.g., by a dryer 96, downstream of the photoreceptor 94.

Other types of marking device, and/or a combination of types of marking device, are also contemplated.

Current operating parameters 98 for the printing device 14, such as printer speed, dryer temperature(s), and the like, may be sent to the adjustment component 12 and stored in memory 50.

A sensor system 100 generates the full width scanned images 34, 36 and provides them to the adjustment component 12. Each (or at least some) of the printed pages of a print job 24 may be automatically scanned to generate a respective scanned image 34, 36. The target image 46, 48 in the respective scanned image 34, 36 generally corresponds to the corresponding source image 16, 18, 20, etc., but may be unintentionally enlarged and/or reduced in one or both x and y dimensions, referred to as magnification errors (and, in some cases, may be rotated, shifted in x and/or y directions, and/or otherwise transformed).

The exemplary sensor system 100 includes at least one in-line scanner, such as a first full-width array scanner (S1) 102 positioned adjacent one side of the transport path 78 to capture a side 1 scanned image 34. The sensor system 100 may include a second full-width array scanner (S2) 104 positioned adjacent the other side of the transport path 78 to capture a side 2 scanned image 36. The first and second scanners 102, 104 may be substantially identical and produce scanned images of the same pixel dimensions to simplify image processing.

While scanners 102, 104 are illustrated as being positioned downstream of both marking devices 72, 74, in another embodiment, the side 1 scanner may be positioned intermediate the marking devices 72, 74. As will be appreciated, however, the process of printing and drying the side 2 image 44 may also affect the magnification of the side 1 image due to further shrinkage/stretching of the sheet. Accordingly, positioning the side 1 and side 2 scanners 102, 104 downstream of all the marking devices 72, 74 (and any additional marking engines) that print images on a same sheet is generally desirable. In the case that a single marking device is used, a single scanner, downstream of the marking device, could be employed and capture a scan as each side is printed. However, as noted above, having two scanners, on opposite sides of the paper path, more accurately captures the magnification changes of the printing process.

The parameter database 56 can be any data structure suitable for storing information. For initially generating the database 56, several sheets of each of a set of different stocks currently available to the printing device 14, and having different print media parameters 92 may be printed with training images 58, e.g., customer images 16, 18, 20 and/or calibration images 26 using different printing parameters 31. Scanned images 34, 36 are acquired for these sheets. Image-on-paper (IOP) data 105, computed based on the scanned images, are used to populate the database 56. The IOP data 105 may include (average) magnification errors computed by comparing the x (cross process) and y (process) dimensions of identified target images in the scanned images with the dimensions of the corresponding source images, and/or adjustments predicted to reduce these magnification errors.

The database 56 may be updated to incorporate IOP data 105 and print media parameters 92 for additional stocks and/or new printing parameters 31/operating parameters 98, and/or to account for drift in the printing device 14 which leads to changes in magnification over time, even when there is no change in print media parameters and printing parameters. In one embodiment, IOP data 105 acquired outside a current time window (e.g., 1 or two days) is automatically discarded from the database 56.

The output device 76 may include one or more trays, positioned downstream of the marking engine(s) 72, 74 and scanner(s) 102, 104. The trays collect the output the printed pages, e.g., as a stack 106 of printed pages. As will be appreciated, the printing device 14 may include additional components, such as one or more of a stacker, stapler, bookbinder, user interface, controller, and the like.

Figure 2A:
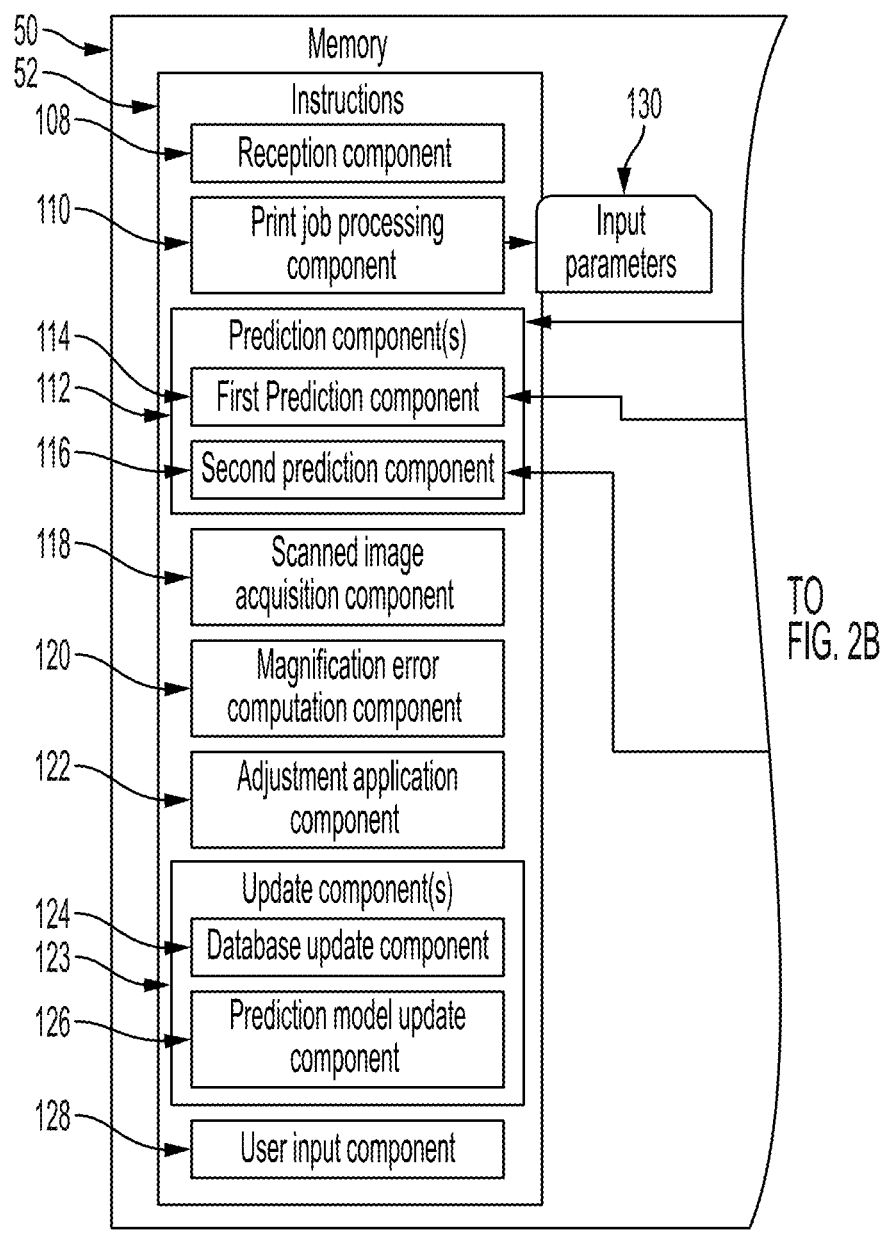
FIG. 2, which is split into FIGS. 2A and 2B for ease of illustration, illustrates components of the adjustment component of FIG. 1.
Figure 2B:
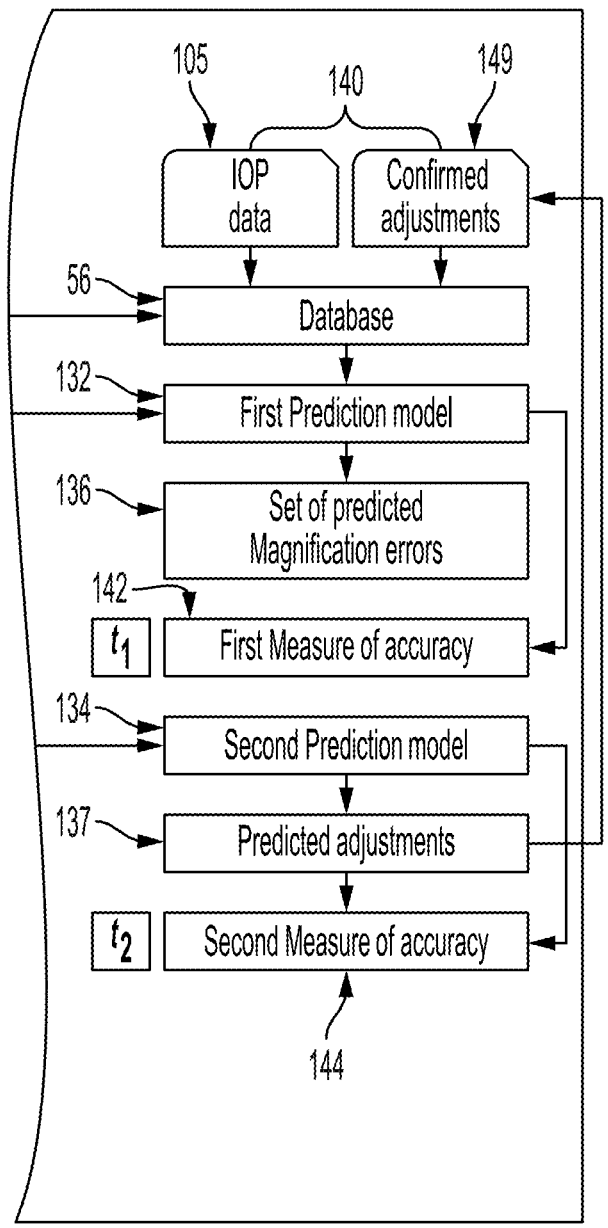

With reference to FIG. 2, which is split into FIGS. 2A and 2B, the software instructions 52 may include at least some of: a reception component 108, a print job processing component 110, a prediction component 112 (which in some embodiments may include first and second prediction components 114, 116 for separately predicting magnification errors and corresponding adjustments), a scanned image acquisition component 118, a magnification error computation component 120, an adjustment application component 122, one or more update components 123, such as a database update component 124 and/or a prediction model update component 126, and a user input component 128.

The reception component 108 receives incoming print jobs 24, training images 58, if used, and scanned images 34, 36 via inputs 62, 63 and stores them to temporary memory in memory 50.

The print job processing component 110 processes the incoming print job 24 to extract print media parameters 30 and printing parameters 31 which may influence magnification errors. The component 110 may retrieve and/or compute print media parameters 92 and operating parameters 98 that are not specified in the print job, 24, such as printer speed, drier temperature, area coverage (area of a printed sheet expected to be occupied by ink or toner), and the like. The print job processing component 110 outputs the parameters 30, 31, 92, 98, or parameters generated therefrom, as a set of input parameters 130 in a suitable form for accessing the database 56 or for accessing one or more prediction models 60, 132, 134, which has/have been generated from the database 56, by machine learning. In one embodiment, the input parameters 130 may be generated by quantizing some or all of the parameters 30, 31, 92, 98 into respective ones of a set number of ranges. For example, an input parameter "area coverage of the sheet" (which may vary between 0 (no ink markings) and 100% (full) coverage) may be computed and assigned to one of three, four, or more area coverage ranges between 0 and 100% coverage. The set of input parameters 130 may include at least two, or at least three, or at least four, or more input parameters, such as up to ten input parameters. Examples of input parameters include print media sheet weight, print media sheet size, print media sheet thickness, print media sheet porosity, print media sheet coating, print media sheet color, area coverage, and combinations thereof.

As illustrated in FIG. 3, which is split into FIGS. 3A and 3B, the database 56 may include, for each of a set of combinations of the input parameters 130, a set of IOP data 105, such as magnification errors 136 and/or adjustments 137 predicted to reduce the errors. The adjustments 137 are computed based on the magnification errors and may have been validated by reprinting. The IOP data 105 can thus be employed by the system 10 to reduce the errors between a given source image 16 and a corresponding target image 46. The IOP data 105 can also be expected to reduce the magnification errors between a subsequent source image 18 and a corresponding printed image, when the source image 18 is subsequently rendered by the same printing device 14 in accordance with the same or similar input parameters 130. The input parameters may include one or both of area coverage and sheet weight and/or other input parameters, as noted above.

The set of predicted magnification errors 136, if incorporated in the database 56, may include at least one magnification error 138, 139. As illustrated, at least two magnification errors may be provided, one in the length (y) direction of the sheet and another in the width (x) direction, e.g., measured in mm or as a percentage error. Alternatively, a single magnification error may be provided, e.g., for length or width or as an average of length and width errors. The magnitude of the error may be defined as positive, in the case of sheet stretching, and negative for sheet shrinkage (or vice versa). For a printing device configured for duplex printing, magnification errors may be provided for both sides of the sheet (e.g., length error, side 1; width error, side 1; length error, side 2, width error, side 2, i.e., as four separate magnification errors). Since duplex printing can affect the magnification errors more than simplex printing, magnification errors for duplex and simplex printing of side 1 may be stored as separate values. The database 56 may be used as a lookup table, e.g., by finding the closest set of parameters 130 to those of a page 16 of a current print job 24 and, provided that the set of parameters is an exact (or close) match to those of the print job page, outputting the predicted magnification errors 136. The required closeness of the match may be set as a threshold difference for each of the input parameters 130. For example, for area coverage a difference of 10% or 20% from the stored input value 130 may be considered to meet the threshold.

Similarly, the adjustments 137, if included in the database 56, may include one or more adjustments to be made to the source image 16 and/or printing device 14 which are predicted to improve IOP registration. This may be as simple as reducing/increasing one or both of the dimensions of the source image or may entail a more complex transformation, which also addresses skew and/or other registration errors, such as process direction and/or cross-process direction shift.

The magnification error(s) 136 used in generating the database and/or prediction model 132 may be computed, by the magnification error computation component 120, in a similar manner to that described in above-mentioned U.S. application Ser. No. 16/988,183. In this method, positions of the corners of the target image 46 (or 48) on the scanned image 34 are first determined. This may be performed by identifying a maximum of four edges of the target image 46 using edge detection, and defining the intersections of these edges as the corners. The length of each edge (distance between adjacent corners), or of at least two intersecting edges, can then be compared to the respective length or width of the digital image 16 from which the scanned image 34 is derived to compute a respective magnification error. The magnification error (in the length or width direction) may be computed as an average over several scanned images generated from the same source image, e.g., as $$\frac{\text{average length (width) of target image}}{\text{length (width) of source image}},$$

or as a function thereof, or as a difference, e.g., average length (width) of target image−length (width) of source image. Alternatively, or additionally, a transform which also takes skew and/or shift into account may be computed.

The parameter database 56 may be built initially by printing training images 58 and/or customer source images 16, 18, 20 multiple times. Each image may be printed on several sheets of the same type, under the same printer parameters, with the printing device 14. Each of the sides of each of the sheets are scanned to capture scanned images 34, 36. The corresponding target images 46, 48 are located in the scanned images 34, 36. IOP data 105 is computed by comparing the input image 16, 18, and the respective target image 46, 48 of the scanned image 34, 36, and averaging the magnification errors 136 (and/or predicted adjustments 137) over at least some of the sheets in the set of sheets (outliers, resulting from printing errors, or the like, may be excluded from the computed averages 138, 139, etc.).

The update component(s) 123 receive new IOP data 105 for rendered print jobs 24 and update(s) the database 56/model(s) 132, 134 based thereon. In one embodiment, the prediction component 112 accesses the parameter database 56 with the set of input parameters 130 for a new print job 24. If the database 56 has a close match to the input parameters, the associated IOP data 105 (e.g., magnification errors 136) are output to the adjustment application component 122. Otherwise, the database update component 124 may call on the scanned image acquisition component 118 to acquire additional IOP data 105 for use in updating the database 56 for that particular set of input parameters.

In another embodiment, the entries in the database 56 may be used to learn one or more prediction models 60, 132, 134 for predicting magnification errors 136 and/or appropriate adjustments 137 predicted to reduce the magnification errors. In this embodiment, the input parameters 130 need not be quantized. Learning of model(s) 60, 132, 134 may be performed with any suitable machine learning method, such as linear regression, logistic regression, neural networks, or the like.

For example, the learning of the first prediction model 132 may include progressively updating parameters (e.g., weights) of the first model until the output of the model (predicted IOP data 105, e.g., predicted magnification error(s) 136), closely matches corresponding previously-computed IOP data 105 (e.g., extracted from database 56) over a set of input parameter 130 combinations. More than one first prediction model 132 may be learned, e.g., four models: one for each of the first side errors (length and width) and one for each of the second side errors (length and width). Alternatively, a single first model 132 is trained to predict the four magnification errors 136. During the model training, the first model 132 learns how much weight to place on each of the input parameters 130 in order to optimize the accuracy of the model's IOP data 105 predictions. In addition to the predicted magnification errors 136, the first model 132 may output a first measure 142 of the accuracy of the predictions 136. The measure 142 may be compared to a predetermined threshold accuracy measure $t_1$ to determine whether the predictions 136 of the model 132 should be used for a given set of input parameters, or not. If the measure 142 of the accuracy meets or exceeds the threshold accuracy measure $t_1$, the output of the first model 132 may be considered acceptable for determining appropriate adjustments 137 that are predicted to reduce the errors. If the measure 142 of the accuracy is below the threshold, the output 136 of the first model 132 may be discarded and a request for additional IOP data 105 to be acquired may be generated.

In one embodiment, the prediction component 112 accesses the prediction model 132 with the set of input parameters 130 for a new print job 24. The model outputs predicted IOP data 105 (e.g., a set of magnification errors) to the adjustment application component 122, provided the measure of accuracy meets the accuracy threshold. Otherwise, the database update component 124 may call on the scanned image acquisition component 118 to acquire data for use in updating the database 56 for that particular set of input parameters. The model 132 may also be updated to reflect the new IOP data 105.

In one embodiment, the adjustment prediction component 122 includes or accesses an adjustment prediction model 134 (second model). The adjustment prediction model 134 may have been trained on training data 140, the training data including acquired IOP data 105 for a set of training images 58 (and/or customer images 16) that have been printed and scanned and computed magnification errors 136 and confirmed adjustments 137 based thereon. The trained second model 134 can then be used to predict adjustments for use in printing the pages 16, 18, 20 of a new print job 24, given the predicted magnification errors 136 output by the first model 132 or retrieved from the database 56. The predicted adjustments 137 may thus be the same or different for different pages of the print job. As for the first model, the predicted adjustments 137 may be associated with a second measure of accuracy 144. The measure 144 may be compared to a predetermined threshold accuracy measure $t_{12}$ to determine whether the adjustment predictions 137 of the model 137 should be used for a given set of input parameters, or not. If the measure 144 of the accuracy meets or exceeds the threshold accuracy measure $t_2$, the output adjustments 137 from the second model can be considered acceptable for reducing the magnification errors, when implemented by the system. If the measure 144 of the accuracy is below the threshold, the output 137 of the second model 134 may be discarded and a request for additional data 105 to be acquired may be generated.

In one embodiment, rather than first and second models 132, 134, a single model may combine the functions of the two models. For example, a combined model 60 (FIG. 1) is trained to predict the adjustments 137, without needing to output predicted magnification errors, and also to provide a measure of accuracy 142 for the predicted adjustments 137). In this embodiment, the model 60 receives as input the parameters 130 for each sheet of a print job and outputs adjustments 137, which may be the same or different from sheet to sheet. The model may be trained on training data 140 including, for each set of input parameters 130, an associated set of adjustments 137 that have been confirmed to reduce computed magnification errors when training images 58 (or prior customer images 16, 18, 20) are printed. The training of the combined model 60 may include updating model parameters to optimize the model's predicted adjustments 137 over at least a part of the training data.

When the database 56 and/or model(s) 60, 132, 134 need(s) to be updated, the scanned image acquisition component 118 sends one or more customer images 16, 18, 20 to the printing device 14 for printing multiple sheets in accordance with the print job parameters 30, 31 (during initial generation of the database and/or model, training images may alternatively be used). The sensor system 100 acquires images 34, 36 for each printed sheet. The adjustment component 12 (e.g., magnification error computation component 120) then computes IOP data 105 (e.g., a set of magnification errors 136) for each printed and scanned page of the print job 24, by computing differences between the source image and corresponding target image(s), and the adjustment application component 122 outputs a set of adjustments 137 (e.g., generated by one or more of the models and/or computed from the magnification errors), which are predicted to reduce the magnification errors 136. The adjustments may include instructions for generating a transformed source image 32, which is larger or smaller in length and/or width dimensions, in order to, at least partially, correct the errors 136. Additionally, or alternatively, the adjustments 137 may include instructions for the printing device 14, such as modifying one or more of the inkjet firing rate, dryer temperature, print speed, or the like, which are expected to reduce the errors. In this case, a printer adjustment component 148 (FIG. 1), which may be located within the printing device 14, may be configured to implement the printer instructions 137.

After/during printing the print job 24 with the printing device 14 using the adjustments 137, the scanned image acquisition component 118 and magnification error computation component 120 may be called on to confirm that the adjustments 137 have reduced the magnification errors, e.g., between a source image 16 and a corresponding target image captured for a printed image 42, between target images captured for printed images 42, 44 on opposite sides of the same sheet 22, and/or between target images captured for printed images on different sheets of the printed print job 24. The adjustments 137, when confirmed, may be referred to as confirmed adjustments 149.

The database update component 124 updates the database 56 as new IOP data 105 are acquired and adjustments are confirmed. Additionally, or alternatively, the prediction model update component 126 updates the prediction model(s) 60, 132, 134 as new data 140 are acquired and confirmed for print jobs. The updating of the database and/or models may be performed for each print job or periodically, e.g., after data 140 for a set of print jobs has been acquired.

In one embodiment, the predicted adjustments 137 may be employed, at least in part, to make adjustments to a registration device (or devices) 150 located upstream of one or both marking devices. The registration device 150 may make adjustments to correct skew, process direction errors, and cross process direction errors in positioning of the sheet, using, for example, a set of nip rollers, airjets, or the like.

In some cases, training data 140 may be acquired on-the-fly, e.g., where a print job 24 requires multiple copies of the same image to be printed. A scan 34 of the first printed image(s) 42 of the job is used to confirm that the adjustments made (if any) have been appropriate for providing IOP errors 136 that meet predetermined tolerances. If not, the adjustments 137 may be recomputed for subsequent copies, with the first copy/copies optionally being discarded.

The user input component 128 may inform the user, via the UI 68, when it is determined that there is a need for new training data 140 for updating the database 56 and/or prediction model(s). In some embodiments, the user may be able to override the acquisition of training data 140, for example, if the print job 24 is urgent or IOP accuracy is not considered to be important for the print job.

As will be appreciated, the magnification adjustment component 12 may be located in or on the printing device 14 or be incorporated in, or include, a remote computing device, such as a print server, laptop, or other computer device. The adjustment component 12 may include one or more computing devices, such as a PC, such as a desktop, a laptop, palmtop computer, portable digital assistant (PDA), server computer, cellular telephone, tablet computer, microprocessor, combination thereof, or other computing device capable of executing instructions for performing the exemplary method.

The memory 50 may represent any type of non-transitory computer readable medium such as random access memory (RAM), read only memory (ROM), magnetic disk or tape, optical disk, flash memory, or holographic memory. In one embodiment, the memory 50 comprises a combination of random access memory and read only memory. In some embodiments, the processor 54 and memory 50 may be combined in a single chip. Memory 50 stores instructions for performing the exemplary method as well as the processed data. In addition to providing adjustments for improved image on paper magnification and registration, other steps in an image processing pathway may also be performed by component 12. These may include, for example, background suppression, color conversion to a different color space, and the like.

The input/output interfaces 62, 63, 64 allow the adjustment component 12 to communicate with other devices via a computer network, such as a local area network (LAN) or wide area network (WAN), or the internet, and may comprise a modulator/demodulator (MODEM) a router, a cable, and/or Ethernet port.

The digital processor device 54 can be variously embodied, such as by a single-core processor, a dual-core processor (or more generally by a multiple-core processor), a digital processor and cooperating math coprocessor, a digital controller, or the like. The digital processor 54, in addition to executing instructions 52 may also control the operation of the printing device 14.

The term "software instructions," or simply "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 4A:
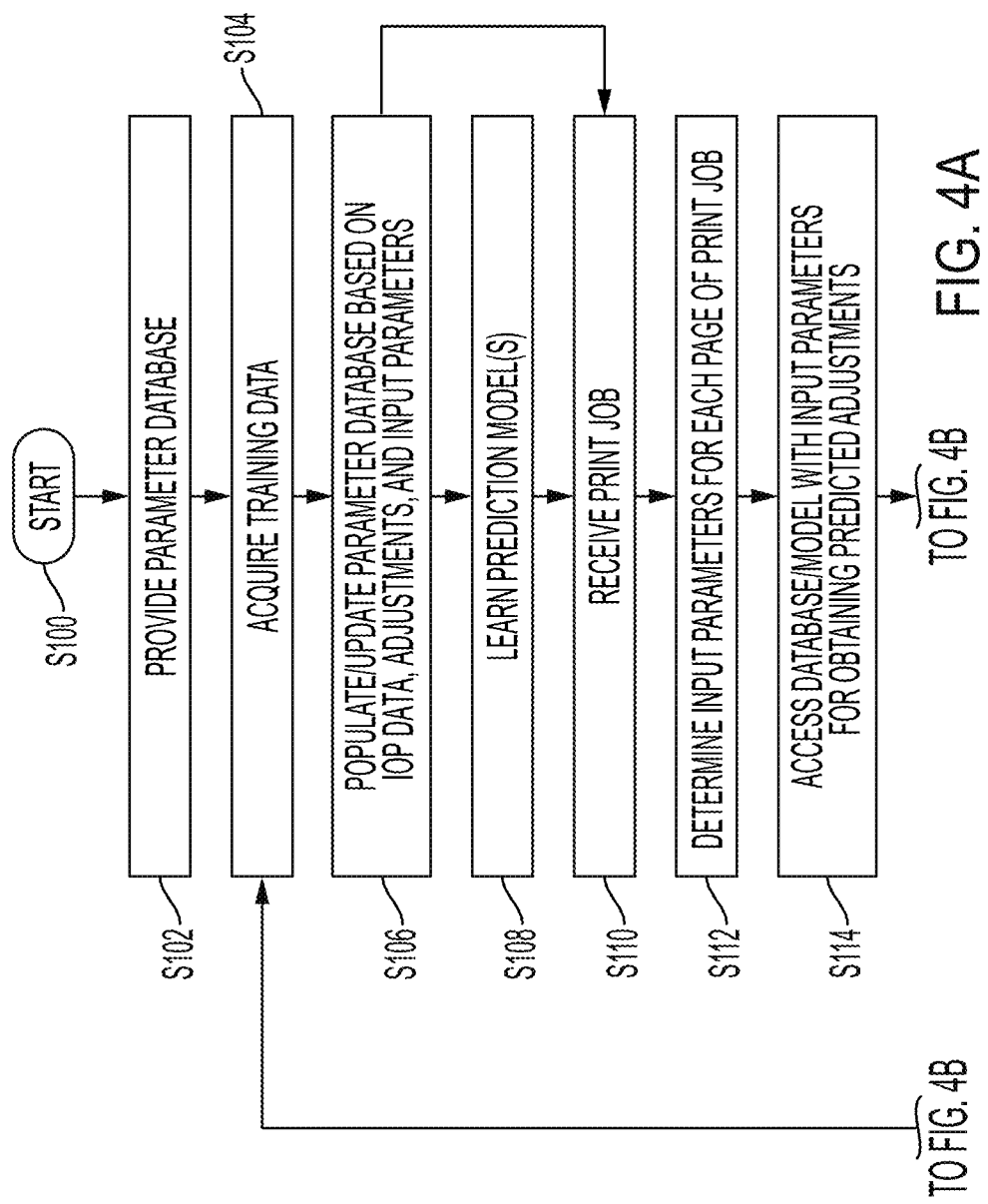
FIG. 4, which is split into FIGS. 4A and 4B for ease of illustration, is a flow chart illustrating a registration method in accordance with another aspect of the exemplary embodiment.
Figure 4B:
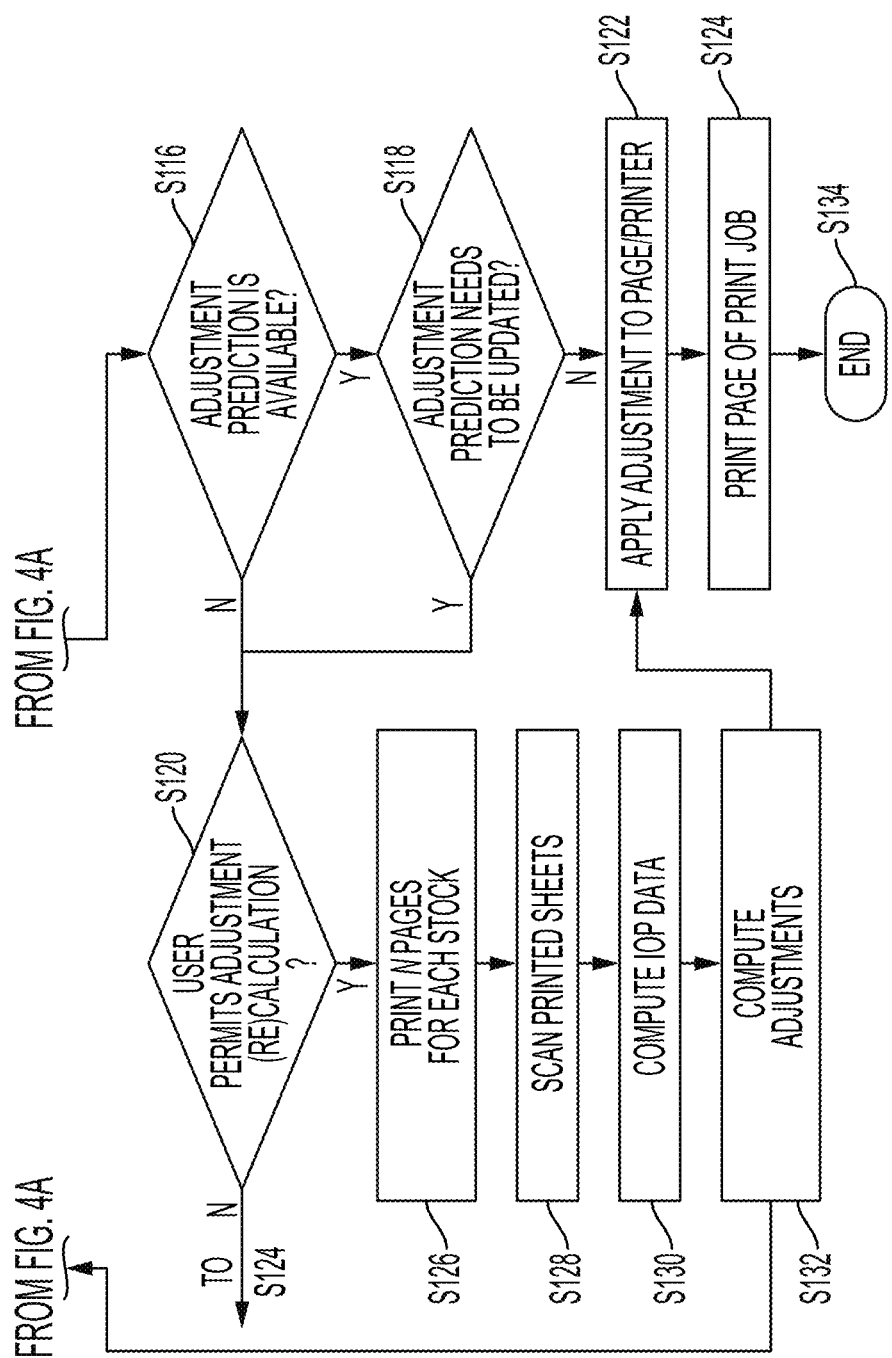

With reference to FIG. 4, which is split into FIGS. 4A and 4B, an image adjustment method which may be performed with the system of FIGS. 1 and 2 is illustrated. The method begins at S100.

At S102, a parameter database 56 may be provided in memory 50. For a new printing device 14, the database 56 may initially be empty or may be populated with data 130, 136, 137 acquired from a similar printing device.

At S104, training data 140 may be acquired for a set of training images 58. The process of acquiring training data 140 is discussed below with reference to FIG. 5.

At S106, the database 56 may be populated, by the database update component 124, based on the acquired training data 140 (input parameters 130 and corresponding IOP data 105 and/or confirmed adjustments 149). The generated/updated database 56 may be stored in memory 50.

At S108 one or more prediction models 60, 132, 134 may be learned/updated, by the prediction model update component 126, based on the acquired training data 140/populated database 56. The learned/updated prediction models 60, 132, 134 may be stored in memory 50.

At S110, a new print job 24 is received, by the reception component 108. The print job 24 may be temporarily stored in memory 50 during processing. As will be appreciated, the print job processing may include several preprocessing steps to generate the instructions for each color separation to be used in rendering each image. Some of these preprocessing steps may be performed prior to S112-S114, while others may be performed during or subsequent to these steps.

At S112, input parameters 130 are determined for each source image (page) of the print job, e.g., based on the print job instructions 28 and/or stored printer and/or print media parameters 92, 98. When pages of the print job are to be printed on different stocks, the input parameters 130 for one page will, in at least some cases, be different from those for another page.

At S114, the database 56 may be accessed with input parameters 130 for each source image of the print job 24 to determine whether the database/model is populated with respective IOP data 105 (e.g., magnification error(s) and/or adjustment prediction(s)) having a threshold level of accuracy. Alternatively, one or more of model(s) 60, 132, 134 is accessed with the input parameters 130.

If at S116, adjustment predictions 137 are available for each sheet, which meet the threshold accuracy measure, the method proceeds to S118. Otherwise, if at S116, there is no IOP data 105 stored in the database or available through the model 132, 134 which is considered to meet the accuracy threshold for at least one of the pages to be printed, the method proceeds to S120.

Optionally, at S118, a determination of whether the prediction(s) 137 need to be updated may be made. For example, if the IOP data 105 was acquired prior to a given time window, or following changes in the printer, print media, marking materials, ambient environment, or the like, it may be considered unreliable. If at S118, it is determined that the prediction(s) 137 need to be updated, the method proceeds to S120, otherwise to S122. At S122, the respective adjustments 137 are made for each page, and at S124, the print job is printed.

Optionally, at S120, a user may be notified via the user interface 68 that updating of the IOP data 105 is recommended. The user may be requested to confirm that pages should be printed for computing/updating adjustments 137. The user thus has the opportunity to override the updating, or select a later time. If the user agrees to the updating, the method proceeds to S126, otherwise to S124, where the print job may be printed without adjustments or with adjustments that may not be optimal. In other embodiments, no user input is sought.

At S126, a number N of pages is printed for one or more page images of the print job, where N may be 1 or more than 1, such as at least 2, or at least 5. In one embodiment, each stock to be used in the print job (or at least for those for which there are no adjustments or adjustments are considered unreliable), are printed N times. In some embodiments, every page 16, 18, 20 in the print job having different input parameters 130 is printed multiple times in accordance with the print job instructions 28 for the page.

At S128, the printed sheet is scanned by the sensor system 100 and the scans 34, 36 sent to the adjustment component 12.

At S130, IOP data 105, such as magnification errors, is computed for each side of the sheet, if duplex printing is used, otherwise for the single printed side, by the component 120. If the averaged magnification errors do not exceed a threshold, it may be determined that no adjustments (or updating of stored adjustments) is/are needed before printing the print job. Otherwise, at S132, the printer adjustments 137 may be computed, based on the IOP errors 136, by the adjustment application component 122. This may include determining an adjustment to each dimension of the source image such that a resulting target image (and hence the printed image) will be the same size, and/or predicting changes to printer operating parameters 98. The method proceeds to S122, where adjustments 137, if needed, are applied to the page and/or printer which are predicted to reduce the magnification errors.

In some embodiments, the sequence of steps S126, S128, S130, S132 may be repeated, one or more times, to confirm that the adjustments have reduced the magnification errors, before printing the print job as a whole.

The method may also return from S132 to S104. The computed magnification errors 105 and/or (confirmed) adjustments 149 may then serve as additional training data 140 for updating the database 56 (S106), and/or for updating one or more prediction models 60, 132, 134 (S108).

The method ends at S134, or may return to S110 when a new print job arrives for printing.

Figure 5:
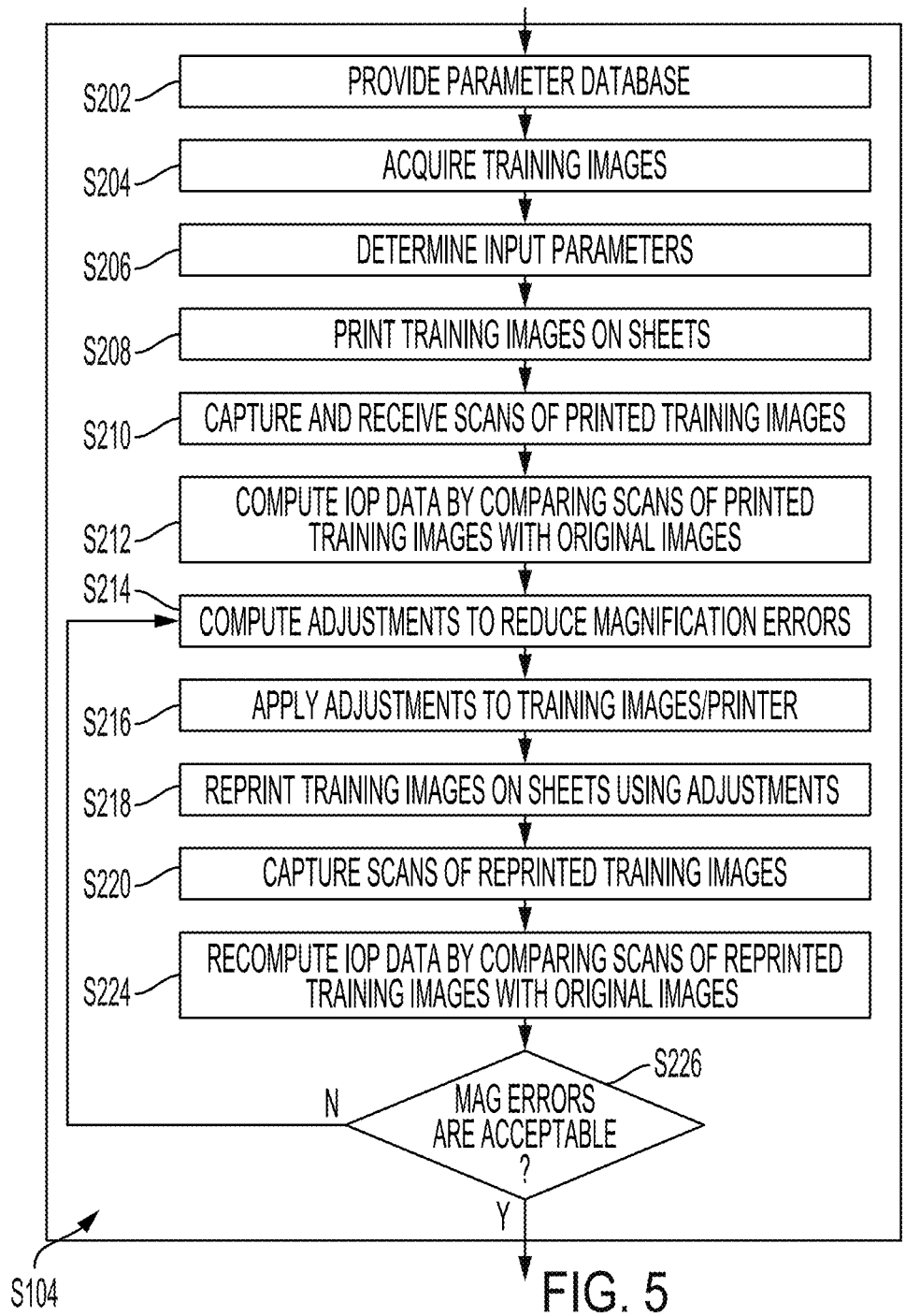
FIG. 5 is a flow chart illustrating part of the registration method of FIG. 4.

With reference to FIG. 5, S104 may include providing a parameter database 56 (S202). The database may be empty or in need of updating.

At S204, one or more training images 58 is/are acquired. The training images 58 may include customer images, a set of representative images at different area coverages, and/or calibration images.

At S206, input parameters 130 may be selected and/or determined. This may include selecting one or more print media type(s) (stock(s)) on which the training image(s) 58 is/are to be printed, predicting area coverage of the image(s) 58, when printed, if not already determined, identifying current printer settings 98 which may affect magnification, and the like.

At S208, the training images are printed on sheets of the selected print media, with the printing device 14. In one embodiment, training images are printed on each of the stocks that are currently available for use on the printing device.

At S210, the printed images are captured with the sensor system.

At S212, IOP data 105, such as magnification errors, is computed from with scanned images, with the magnification error computation component 120. This includes identifying up to four corners of a target image within the scanned image, determining the length/width of the edges connecting the corners, and comparing these with the length and/or width of the digital source image to compute the magnification errors.

At S214, adjustments 137 are computed with the adjustment application component 122.

1At S216, the adjustments are applied to the training images (and/or to the printing device).

At S218, the adjusted training images are reprinted.

At S220, the reprinted training images are scanned with the sensor system 100.

At S222, IOP data 105, e.g., magnification errors are recomputed with the magnification error computation component 120.

At S224, if the IOP (magnification) errors are below a threshold (or after several iterations of S214-S222, another stopping point is reached, such as no significant improvements in magnification errors), the method proceeds to S106, where the input data 130 and adjustments 137 which best reduce the magnification errors are used to populate the database 56. Otherwise, the method may return to S214.

The method illustrated in FIGS. 4 and 5 may be implemented, at least partially, in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the adjustment component 12 (for example, an internal hard drive of RAM), or may be separate (for example, an external hard drive operatively connected with the component 12), or may be separate and accessed via a digital data network such as a local area network (LAN) or the Internet (for example, as a redundant array of inexpensive or independent disks (RAID) or other network server storage that is indirectly accessed by the component 12, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIGS. 4 and/or 5, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

The exemplary system and methods can provide several advantages/benefits:

1. An image-based technique with the ability to measure, define and store image on paper values, specifically magnifications, to provide improved registration, particularly during mixed paper job.

2. The ability to adjust the image on paper magnification for each page of a mixed page job, based on parameters such as the paper weight selected for the job and the area coverage of that page.

3. The ability to verify that adjustments have corrected the magnification errors.

4. A reduction in the amount of time a customer needs to spend in making adjustments for different paper stocks.

5. A magnification adjustment component which is able to store image on paper values on different paper stocks.

Without intending to limit the scope of the exemplary embodiment, the following Examples demonstrate the advantages of the present system and method.

Examples

Figure 6:
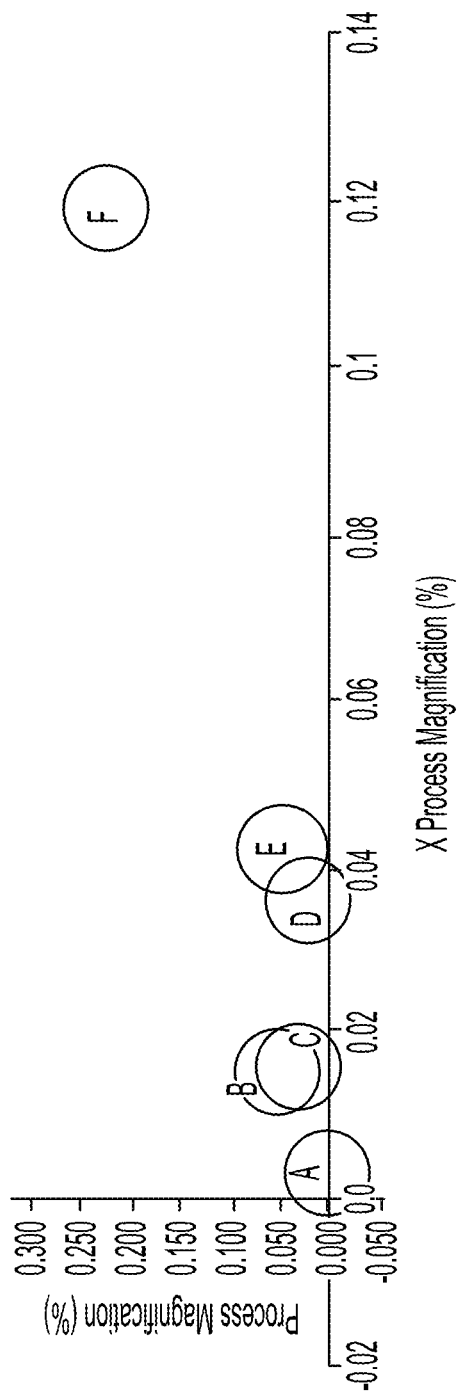
FIG. 6 illustrates shrinkage for different devices.

With reference to FIG. 6, process direction and cross-process direction image magnification adjustments are shown for a set of commercial inkjet printers, labeled A-F, using a standard target dot pattern used for image registration, under similar operating conditions. As can be seen, the magnification adjustments can vary from printer to printer and can vary between process and cross-process directions.

The graph shown in FIG. 6 does not capture variations in magnification needed to compensate for differences in sheet weight, area coverage, and the like. Using a standard calibration image thus has limitations in making adjustments for magnification where the customer can print on each color, more than 3.682 ml/m$^2$ ink density, as compared to about 0.101 ml/m$^2$ ink density, for an example black-only calibration image, having 5% half tone.

Figure 7:
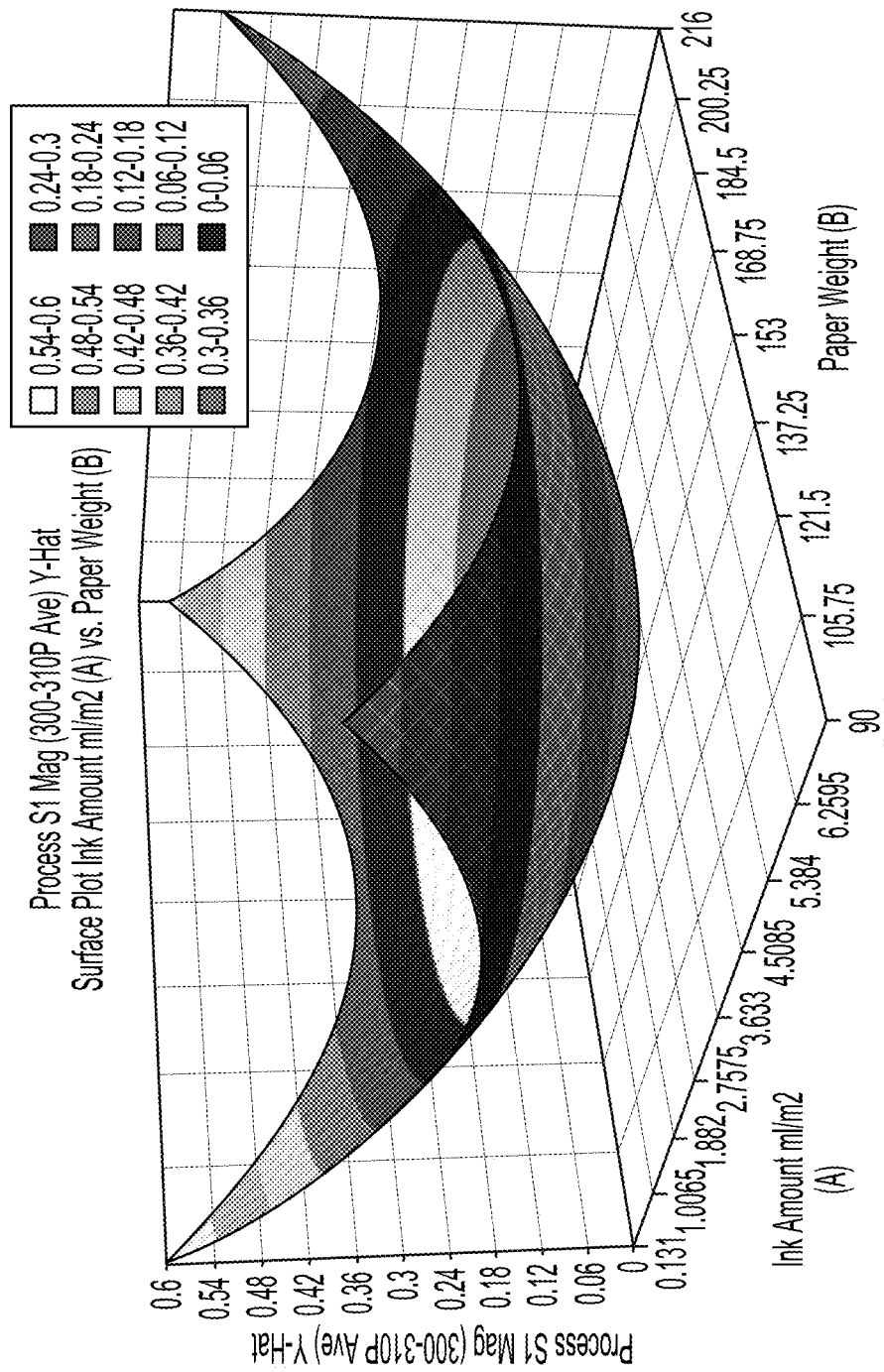
FIG. 7 illustrates the effects of ink amount and paper weight on magnification.

FIG. 7 illustrates the combined effects of sheet weight and ink amount on paper shrinkage in an example printing device, where the customer may see a shrinkage of up to about 0.54%. As an example, if a 11×17 inch (279.4×431.8 mm) paper stock is used with a weight of 90 GSM/500 sheets, the customer image can be 1.5 mm smaller in one direction and 2.41 mm in the other (depending, to some degree, on paper grain direction). Dryer temperature can also affect shrinkage.

A stock library (database) is developed by saving the Y-registration, YDots Per Inch, printer settings, per paper side, per speed for each configured paper, together with other IOP registration parameters.

During a print run, the system uses the magnification and other settings stored in the stock library for the given stock and printer speed. If no setting is stored for the given stock/speed mode combination, the system may default to using the system default values. Since the magnifications are dryer power dependent, magnification and other values are updated each time IOP is performed.

TABLE 1 shows typical values stored in a database. Manufacturer (Mfr) and machine (Mach) details have been anonymized.

TABLE 1

Example database

| Mfr | Mach. | Paper wt. (gsm) | Process mag. | X-process mag. |
|-----|-------|-----------------|--------------|----------------|
| A | 1 | 120 | 0.0446 | 0.0154 |
| A | 2 | 120 | 0.0240 | 0.0360 |
| A | 3 | 90 | 0.2220 | 0.1190 |
| B | 4 | 100 | 0.0030 | 0.0030 |
| C | 5 | 100 | 0.0500 | 0.0420 |
| D | 6 | 100 | 0.0320 | 0.0160 |

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An image processing system comprising:
   a reception component which receives a current print job comprising a set of digital page images to be printed on print media sheets;
   a print job processing component which identifies, for each page image, a set of input parameters, the set of input parameters including at least one of:
   a) at least one of a sheet weight and an area coverage,
   b) a dryer temperature parameter, and
   c) a printing device speed;
   at least one prediction component for generating an adjustment for each page image, based on the set of input parameters and based on stored magnification errors generated for prior print jobs, the adjustment being predicted to reduce at least one magnification error when the page image is rendered on print media to form a printed image;
   an adjustment component which implements the adjustments; and
   a processor which implements the components.

2. The system of claim 1, wherein the system includes a database generated from the stored magnification errors and wherein the prediction component accesses the database with the set of input parameters.

3. The system of claim 1, wherein the system includes a predictive model generated from the stored magnification errors and wherein the prediction component accesses the predictive model with the set of input parameters.

4. An image processing system comprising:
   a reception component which receives a current print job comprising a set of digital page images to be printed on print media sheets;
   a print job processing component which identifies, for each page image, a set of input parameters, the set of input parameters including at least at least one of a print media sheet weight, a print media sheet size, a print media sheet thickness, a print media sheet porosity, a print media sheet coating, a print media sheet color, an area coverage, and a printing device speed;
   at least one prediction component for generating an adjustment for each page image, based on the set of input parameters and based on stored magnification errors generated for prior print jobs, the adjustment being predicted to reduce at least one magnification error when the page image is rendered on print media to form a printed image;
   an adjustment component which implements the adjustments;
   at least one update component which causes the associated printing device to print one or more page images of the current print job on one or more print media sheets, when the prediction component is unable to generate an accurate adjustment for the respective page image; and
   a processor which implements the components.

5. The system of claim 1, further comprising:
   a sensor system which captures a scanned image of a print media sheet which has been printed with a printed image by the associated printer, based on a digital page image;
   a scanned image acquisition component which acquires the scanned image;

a magnification error computation component which computes at least one magnification error based on a comparison between the digital page image and a target image identified in the scanned image; and an update component which updates a database or prediction model which is accessible to the prediction component, based on the least one computed magnification error.

6. The system of claim 5, wherein the sensor system comprises:
a first scanner which captures a scanned image of a first side of a print media sheet which has been printed with a first printed image, based on a first digital page image; and
a second scanner which captures a scanned image of a second side of the print media sheet which has been printed with a second printed image, based on a second digital page image.

7. The system of claim 1, wherein the at least one magnification error comprises a plurality of magnification errors.

8. The system of claim 7, wherein the plurality of magnification errors comprises a magnification error for each of first and second dimensions of the printed image.

9. The system of claim 7, wherein the plurality of magnification errors comprises a magnification error for each of first and second dimensions for each of first and second side printed images.

10. The system of claim 4, wherein the set of input parameters comprises at least one input parameter selected from the group consisting of:
at least one of the sheet weight and the area coverage;
a dryer temperature parameter; and
a printing device speed.

11. The system of claim 1, wherein the implementing of the adjustments comprises changing at least one of the dimensions of the page image.

12. The system of claim 1, further comprising a printing device which renders the page images on sheets of print media to form respective printed images.

13. A method comprising:
for each of a plurality of prior print jobs:
determining input parameters for the prior print job, and
generating magnification errors for the prior print job, including capturing a scanned image of a print media sheet which has been printed with a printed image by an associated printer, based on a digital page image, and computing at least one magnification error based on a comparison between the digital page image and a target image identified in the scanned image;
receiving a current print job comprising a set of digital page images to be printed on print media;
identifying, for each page image, a set of input parameters, the set of input parameters being selected from the group consisting of:
at least one of a print media sheet weight and an area coverage,
a dryer temperature parameter, and
a printing device speed;
generating an adjustment for each page image, based on the set of input parameters and based on magnification errors generated for the prior print jobs and the respective input parameters determined for the prior print jobs, the adjustment being predicted to reduce at least one magnification error when the page image is rendered on print media by the associated printing device; and
implementing the adjustments.

14. The method of claim 13, wherein the generating of the adjustment comprises, for each page image, accessing at least one of a database and a predictive model with the set of input parameters.

15. The method of claim 14, further comprising:
capturing a scanned image of a print media sheet which has been printed with a printed image by the associated printer, based on a digital page image;
computing at least one magnification error based on a comparison between the digital page image and a target image identified in the scanned image; and
updating at least one of the database and the prediction model, based on the least one computed magnification error and the input parameters for the page image.

16. The method of claim 14, further comprising:
generating the at least one of the database and the predictive model based on the input parameters and magnification errors for printed pages generated by printing prior print jobs.

17. The method of claim 13, further comprising:
capturing a scanned image of a print media sheet which has been printed with a printed image by the associated printer, based on a digital page image and identifying a target image in the scanned image which corresponds to the printed image.

18. The method of claim 17, wherein the capturing of the scanned image comprises:
capturing a scanned image of a first side of a print media sheet which has been printed with a first printed image, based on a first digital page image; and
capturing a scanned image of a scanned image of a second side of the print media sheet which has been printed with a second printed image, based on a second digital page image.

19. The method of claim 13, wherein the computing of the at least one magnification error comprises computing a magnification error for each of first and second image dimensions of printed image;
capturing a scanned image of a print media sheet which has been printed with a printed image by the associated printer, based on a digital page image.

20. An image processing system comprising:
a printing device which renders digital page images of a print job on print media sheets to form printed images;
a sensor system which captures scanned images of the printed images; and
a magnification adjustment component which adjusts the printing of the digital page images to reduce predicted magnification errors in the printed images, based on:
an area coverage and a print media sheet weight for printing each of the digital page images; and
magnification errors and respective area coverage and print media sheet weight for previously printed images.

* * * * *